US006930787B1

(12) United States Patent
Hayasaki

(10) Patent No.: US 6,930,787 B1
(45) Date of Patent: Aug. 16, 2005

(54) IMAGE PROCESSING APPARATUS AND IMAGE COMMUNICATION APPARATUS FOR PROTECTING IMAGE INFORMATION, AND METHOD FOR CONTROLLING THE SAME

(75) Inventor: Minoru Hayasaki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/449,972

(22) Filed: Nov. 26, 1999

(30) Foreign Application Priority Data

Nov. 30, 1998 (JP) .......................................... 10-339875

(51) Int. Cl.[7] ............................ G06F 3/12; G06F 12/14
(52) U.S. Cl. ..................... 358/1.14; 358/1.15; 358/1.16
(58) Field of Search .................... 358/1.14, 1.9, 358/1.15, 2.96, 1.1, 1.13, 1.16, 401, 448, 452, 502; 713/200

(56) References Cited

U.S. PATENT DOCUMENTS 5,777,617 A * 7/1998 Kishimoto .................. 345/418
6,078,399 A * 6/2000 Kadota ....................... 358/1.13
6,426,809 B1 * 7/2002 Hayashi et al. ............. 358/529
2003/0107776 A1 * 6/2003 Maeda ........................ 358/402
2003/0118242 A1 * 6/2003 Nakayama et al. ......... 382/245

FOREIGN PATENT DOCUMENTS

JP            409130573 A * 5/1997 ............ H04N/1/34

* cited by examiner

*Primary Examiner*—Scott A. Rogers
(74) *Attorney, Agent, or Firm*—Fitzpatrick, Cella, Harper & Scinto

(57) ABSTRACT

An image processing apparatus includes a receiving unit for receiving image information, a storage unit for storing the image information received by the receiving unit, an output unit for outputting the image information received by the receiving unit, a discriminating unit for discriminating among modes used when the image information is output by the output unit, and a control unit in which after the image information is output by the output unit in accordance with discrimination by the discriminating unit, the control unit performs control so that the image information output by the output unit is not stored in the storage unit.

12 Claims, 5 Drawing Sheets

IMAGE PROCESSING APPARATUS AND IMAGE COMMUNICATION APPARATUS FOR PROTECTING IMAGE INFORMATION, AND METHOD FOR CONTROLLING THE SAME

BACKGROUND OF THE INVENTION

1. Field of the Invention

The present invention relates to an image processing apparatus and an image communication apparatus for apparatuses and systems, such as electrophotographic apparatuses, electrostatic recorders, ink-jet printers, and printing machines, that form image information on a recording medium such as paper in a visual form (so that the information can be observed), and to a method for controlling the image processing apparatus and the image communication apparatus.

2. Description of the Related Art

In conventional print-output, an output apparatus (hereinafter referred to also as an "image forming apparatus"), such as a printer and a digital copier, that visually forms (prints out) image information on a recording medium such as paper is connected to a network such as a local area network (LAN), and the output apparatus is used to perform printout from a computer connected to the same network.

There may be a case where the output apparatus is connected to the network via an image processing apparatus as a controller (or the like) controlling the output apparatus. Also, it is possible that a plurality of output apparatuses are connected to the same image processing apparatus. In this case, from among print queues corresponding to the output apparatuses, an arbitrary print queue can be selected in a computer connected to the same network. Accordingly, a user can use, from an arbitrary computer connected to the network, an arbitrary output apparatus connected to the network to perform print-output.

In addition, there is a system that charges for the number of printed pages output by the output apparatus in the above-described construction. This system is often used for commercial use, etc., and the number of printed pages or the number of copies is counted by an operator or a user so that the counted number is to be charged.

In the above-described system, print-output of image information is performed after temporarily storing the image information in a storage unit of the output apparatus (or an image processing apparatus controlling the output apparatus). Accordingly, a large number of reproductions can be obtained by changing an actually counted number of printed pages (reproductions). This causes a serious problem in commercial use. In the case where image information to be printed is widely used on the network and has a copyright, the copyright of the image information must be protected by managing print-number information on the number of printed pages and error information on the termination condition of the print-output.

Also in the case where an output apparatus such as a printer or a digital copier connected to a network is used to perform print-output from a computer connected to the same network, a system configuration can be established in which a user downloads and stores the desired image information to be printed in storage and uses an output apparatus to print the image information via the network. Thus, if image information to be printed has a copyright, the user can perform print-output (reproduction) of the image information any number of times after downloading the image information. In other words, the above-described system configuration causes a problem in that the protection of the image information copyright is impossible because a user-selected arbitrary output apparatus on the network can perform print-output of an arbitrary number of pages having the image information.

SUMMARY OF THE INVENTION

Accordingly, it is an object of the present invention to provide an image processing apparatus and an image communication apparatus that prevent image information from being illegally used, and to provide a method for controlling the apparatuses.

It is another object of the present invention to provide an image processing apparatus and an image communication apparatus that efficiently manages the output of image information, and to provide a method for controlling the apparatuses.

To these ends, according to an aspect of the present invention, the foregoing objects are achieved through provision of an image processing apparatus including a receiving unit for receiving image information, a storage unit for storing the image information received by the receiving unit, an output unit for outputting the image information received by the receiving unit, a discriminating unit for discriminating among modes used when the image information is output by the output unit, and a control unit in which after the image information is output by the output unit in accordance with discrimination by the discriminating unit, the control unit performs control so that the image information output by the output unit is not stored in the storage unit.

When the discriminating unit discriminates a first mode among the modes, the control unit may store the image information received by the receiving unit in the storage unit and may control the output unit to output the stored image information. When the discriminating unit discriminates a second mode among the modes, the control unit may control the output unit to output the image information received by the receiving unit without storing the image information received by the receiving unit in the storage unit.

The output unit may output the image information stored in the storage unit. When a first mode among the modes is discriminated by the discriminating unit, and the image information stored in the storage unit is output, the image information stored in the storage unit may be set so as be overwritten, while when a second mode among the modes is discriminated by the discriminating unit, and the image information stored in the storage unit is output, the image information stored in the storage unit may be erased.

The discriminating unit may discriminate among the modes when the image information output by the output unit is to be charged or when the image information output by the output unit is not to be charged.

The discriminating unit may discriminate among the modes, based on an instruction from an image-information transmitter.

According to another aspect of the present invention, the foregoing objects are achieved through provision of an image communication apparatus connectable to an image output apparatus. The image communication apparatus includes a determining unit for determining whether or not an image to be transmitted to the image output apparatus is a specific image, and a transmitting unit for transmitting the information of the image in a first format or a second format in accordance with the determination by the determining unit.

When the determining unit has determined that the image to be transmitted to the image output apparatus is the specific image, the transmitting unit may transmit the information of the image in the form of a page description language, while when the determining unit has determined that the image to be transmitted to the image output apparatus is not the specific image, the transmitting unit may transmit the information of the image in the form of bitmap data.

According to a further aspect of the present invention, the foregoing objects are achieved through provision of a method for controlling an image processing apparatus. The method includes the steps of receiving image information, storing the image information in storage, outputting the image information received in the receiving step; discriminating among modes used when the image information is output in the output step, and controlling the image processing apparatus so that after the image information is output in accordance with the discrimination in the discriminating step, the image information output in the output step is not stored in the storage.

When a first mode among the modes is discriminated in the discriminating step, the image information received in the receiving step may be stored in the storage, and the stored image information may be output in the output step, while a second mode among the modes is discriminated, the image information received in the receiving step may be output in the output step without being stored in the storage.

The image information stored in the storage may be output in the output step. When a first mode among the modes is discriminated in the discriminating step, and the image information stored in the storage is output, the image information stored in the storage may be set in the control step so as to be overwritten, while when a second mode among the modes is discriminated in the discriminating step, and the image information stored in the storage is output, the image information stored in the storage may be erased in the control step.

The discriminating step may discriminate among the modes when the image information output in the output step is to be charged or when the image information output in the output step is not charged.

The discriminating step may discriminate the modes, based on an instruction from an image-information transmitter.

According to a still further aspect of the present invention, the foregoing objects are achieved through provision of a method for controlling an image processing apparatus connectable to an image output apparatus. The method includes the steps of determining whether an image to be transmitted to the image output apparatus is a specific image, and transmitting the information of the image in a format among a first format and a second format in accordance with the determination obtained in the determining step.

When the determining step has determined that the image to be transmitted to the image output apparatus is the specific image, the information of the image may be transmitted in the form of a page description language in the transmitting step, while when the determining step has determined that the image to be transmitted to the image output apparatus is not the specific image, the information of the image may be transmitted in the form of bitmap data in the transmitting step.

According to the present invention, when a specific mode is set, or when image information to be output is specific image information (image information to be charged for its copyright), an image processing apparatus outputs the image information without storing the image information in storage of the image processing apparatus. The image processing apparatus erases the image information after outputting the image information.

Specifically, in the case where a specific print-output mode is not set, by using a print queue (spooler) unit as in the normal print operation so that the operation of printing and computer processing are separated, a load on the computer can be reduced. In the case where the specific print-output mode is set (or image information is to be charged), the need for protecting copyright is recognized, and the image information is output by printing without being stored in any one of the computer, a printer server, and a printer (so that no data remain in a print queue). Thereby, in one downloading operation by the computer, the number of output pages is managed. This can securely prevent a user from falsely obtaining a great number of reproductions by changing the number of output pages. Also in the case where image information output from the computer is specific information (image information with charge) to be charged, the number of output pages is managed and the printing of an arbitrary number of pages is not allowed, whereby the copyright of the image information can be securely protected.

Therefore, according to the present invention, image information stored in a storage medium is securely protected, even if the image information is such a specific image as to have a copyright or the like, and the output of the image information can be securely and efficiently managed.

Further objects, features, and advantages of the present invention will become apparent from the following description of the preferred embodiments with reference to the attached drawings.

DESCRIPTION OF THE PREFERRED EMBODIMENTS

The embodiments of the present invention are described below with reference to the accompanying drawings.

First Embodiment

Figure 1:
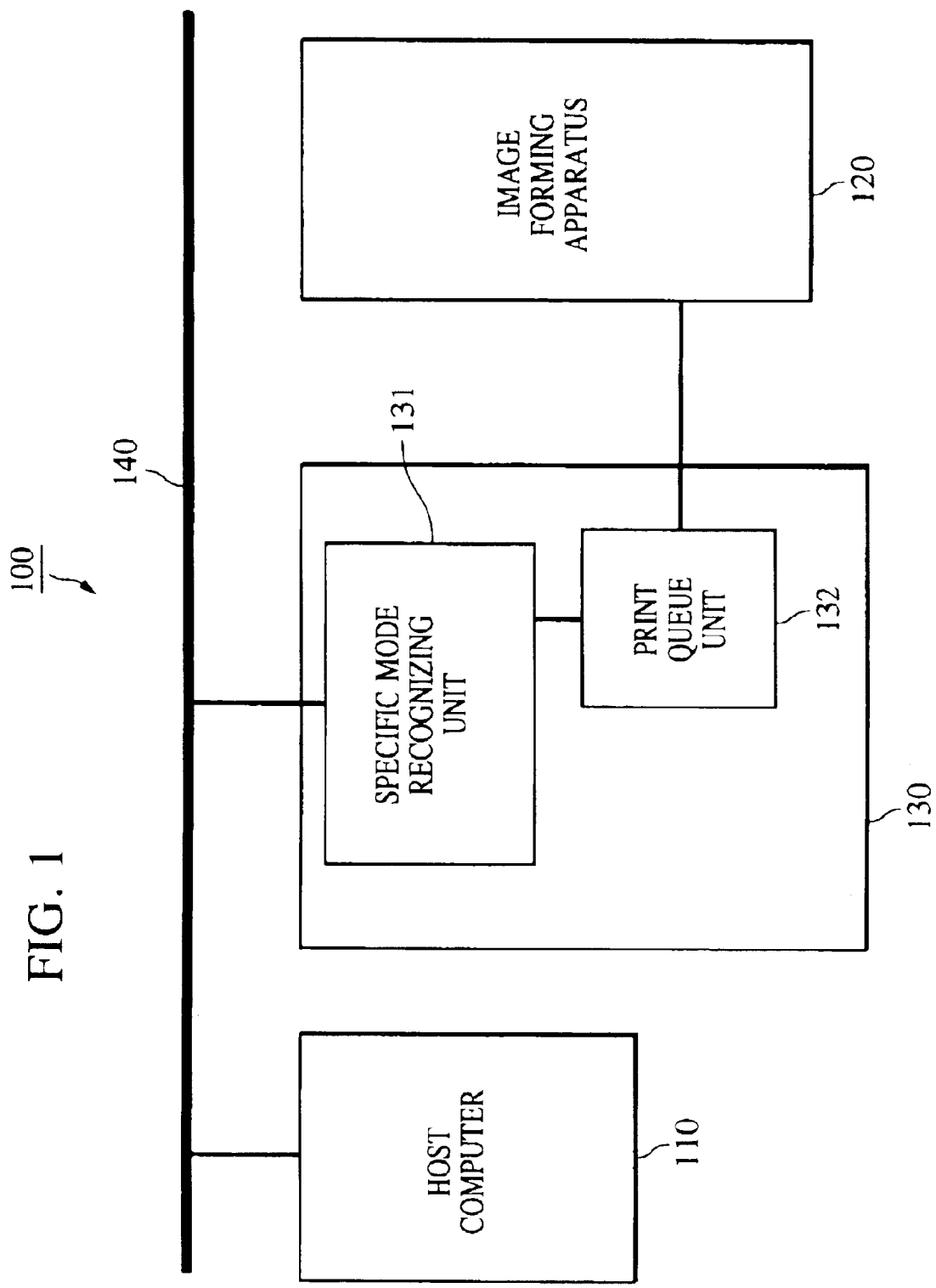
FIG. 1 is a block diagram showing a print system according to a first embodiment.

The present invention is applied to, for example, the print system 100 shown in FIG. 1.

The print system 100 is formed by connecting a computer (host computer) 110 and an image processing apparatus 130 to a network 140.

An image forming apparatus 120 that outputs image information visually formed on a recording medium such as paper is connected to the image processing apparatus 130. The image processing apparatus 130 controls the image forming apparatus 120, and relays information transferred from the host computer 110 to the image forming apparatus 120 via the network 140. The image processing apparatus 130 includes a specific mode recognizing unit 131 for recognizing a specific mode (described below), and a print queue (spooler) unit 132 in which received data are loaded and stored.

The image forming apparatus 120 visually forms received data on a recording medium such as paper, and outputs the formed data. In the first embodiment, the image forming apparatus 120 is a printer.

The computer 110 is designed to use the printer 120 to print arbitrary image information.

In FIG. 1, for brevity of description, an arrangement using one computer 110 and one printer 120 is shown. However, the print system 100 is not limited to the arrangement, but a plurality of computers 110 may be connected to the network 140, and a plurality of printers 120 may be connected to the image processing apparatus 130. The image forming apparatus 120 is not limited to a printer, =but may be a copying machine such as a digital copier.

The print system 100 has a normal mode for performing normal print-output, and a specific mode for performing specific print-output such as the printing of an image to be charged. In accordance with either mode, the print system 100 uses the printer 120 to perform a print-output operation.

When the normal mode is set, by using the print queue (spooler) unit 132 to separate processes performed by the printer 120 and the computer 110, the processing load on the computer 110 can be reduced. When the specific mode is set, by printing the image information output from the computer 110 without storing it in the image processing apparatus 130, the number of times the image information is printed is managed for one downloading operation of the image information from the computer 110.

The setting of the normal mode and the specific mode includes a method including the steps of adding, to image information transmitted by the computer 110, information representing whether the image information (for which charging is performed) is to be processed in the specific mode, and controlling the image processing apparatus 130 to use the added information for mode discrimination, and a method in which, when the computer 110 transmits an image, information added to the image is used to recognize a mode for outputting the image, whereby the computer 110 designates a mode for the image processing apparatus before performing transmission to the image processing apparatus 130.

Figure 2:
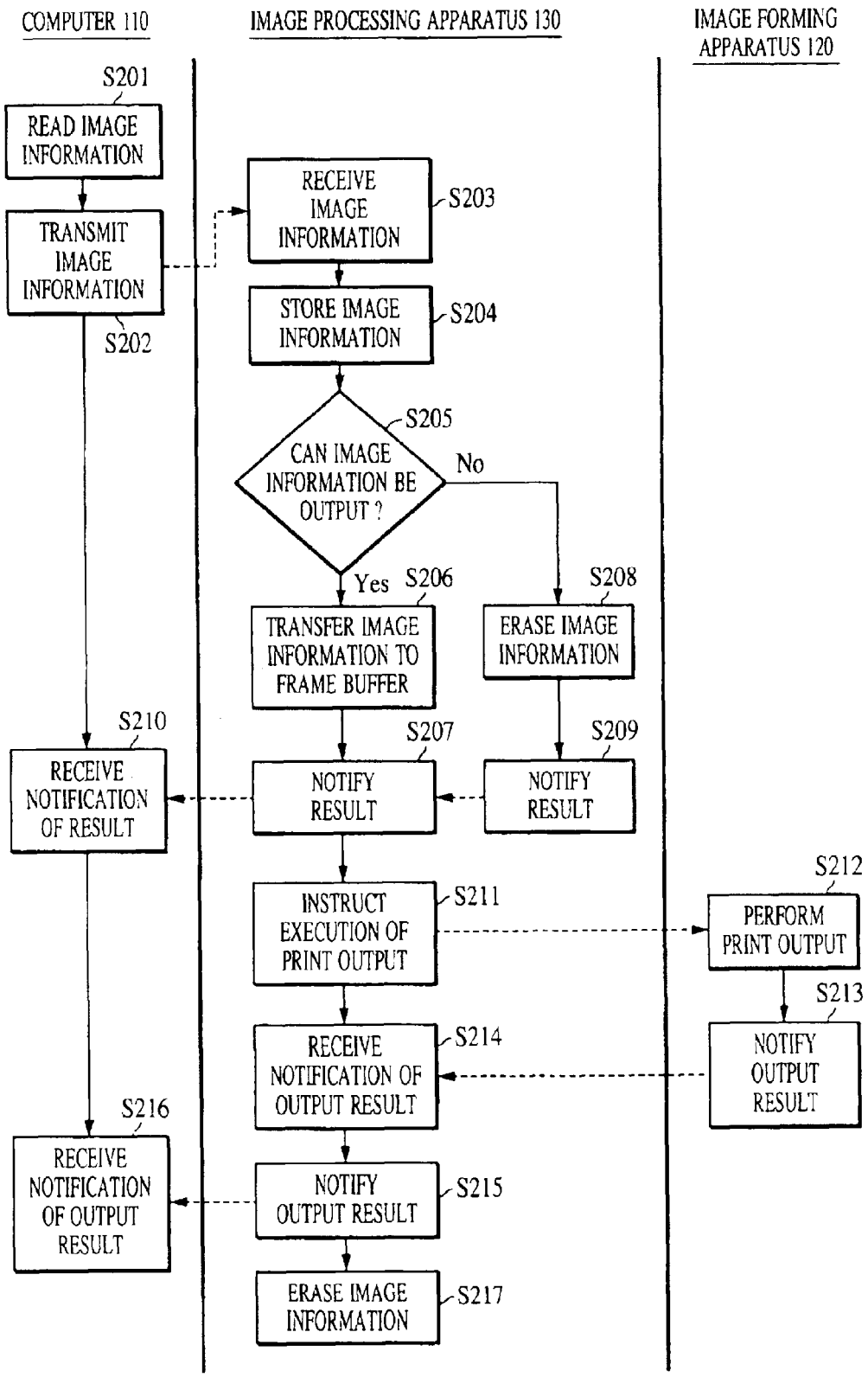
FIG. 2 is a flowchart illustrating the operation of the print system shown in FIG. 1 when it is set to be in a normal mode.

A process performed in the print system 100 when it is set to be in the normal mode is specifically described below with reference to FIG. 2.

In step S201, the computer 110 uses a predetermined application to read (download) image information such as documents and images.

In step S202, the computer 110 uses a printer driver to create, based on the image information read in step S201, code for converting image information received from the computer 110 by the printer 120 into a bitmap image, and transmits the code as a job to the image processing apparatus 130. The job to be transmitted includes not only print-output information, such as a sheet size, the number of pages, and a print mode, which are used to print the image information, but also information indicating whether the image information is allowed to be printed by the printer 120 (i.e., information indicating whether the image information is prohibited to be printed for protecting bank notes, securities, and copyright), and a control code (hereinafter referred to as a "predetermined code") indicating whether image processing is allowed.

In step S203, the image processing apparatus 130 receives the job (image information) from the computer 110.

In step S204, the image processing apparatus 130 records (queues) the job received in step S203 in the print queue unit 132 corresponding to the printer 120. In other words, the image processing apparatus 130 stores, in the spooler, image information to be printed in units of jobs.

In the case where a plurality of printers are connected to the image processing apparatus 130, based on the designation (from the computer 110) of a printer to be used, the image processing apparatus 130 records the job in a print queue unit corresponding to the designated printer. At this time, the image processing apparatus 130 performs recording in a predetermined print queue unit if no particular designation is received from the computer 110.

In step S205, the image processing apparatus 130 determines, based on the predetermined code included in the job, whether the job recorded in the print queue unit 132, that is, the image information stored in the spooler, is allowed to be printed by the printer 120.

Specifically, in an access-controlled memory (not shown) in the image processing apparatus 130, operation-provision-content information corresponding to the predetermined code is stored beforehand. The image processing apparatus 130 performs the determination by, for example, comparing the operation-provision-content information and the predetermined code included in the job recorded in the print queue unit 132.

If the determination result represents that the image information to be processed is allowed to be printed, the process proceeds to step S206. If the determination result is negative, the process proceeds to step S208.

In step S206, if the determination result represents that the image information (to be processed) is allowed to be printed, the image processing apparatus 130 confirms that the image information is not prohibited to be printed so that bank notes, securities, and copyright are protected, and performs predetermined image processing on the image information as required. The image processing apparatus 130 expands the processed image information into bitmap data in accordance with print-output information included in the job, and transfers it to a frame buffer (not shown).

After executing step S206, the image processing apparatus 130 notifies the computer 110 of completion of queuing in step S207.

In step S210, the computer 110 receives and recognizes the notification from the image processing apparatus 130.

In step S211, the image processing apparatus 130 transmits information representing an instruction for executing print-output to the printer 120, together with the image information transferred to the frame buffer in step S206.

In step S212, the printer 120 executes the print-output of the transmitted image information in accordance with the transmitted print-output instruction.

In step S213, the printer 120 notifies the image processing apparatus 130 of the result (whether the print-output was normally completed) of the print-output in step S212.

When receiving the notification of the print-output result from the printer 120 in step S214, the image processing apparatus 130 transmits it to the computer 110 in step S215.

In step S216, the computer 110 receives and recognizes the notification from the image processing apparatus 130.

In step S217, the image processing apparatus 130 sets the job recorded in the print queue unit 132 (i.e., the job corresponding to the notification of the print-output result from the printer 120) so as to be overwritten.

In step S208, if the determination in step S205 represents that the image information to be processed is not allowed to be printed, the image processing apparatus 130 erases the job recorded in the print queue unit 132 in step S204.

In step S209, the image processing apparatus 130 notifies the computer 110 that queuing was incomplete.

In step S210, the computer 110 receives and recognizes the notification from the image processing apparatus 130.

The operation of the print system 100 when the specific mode is set is described below with reference to FIG. 3.

In step S301, the print system 100 is set to be in the normal mode and operates in accordance with the normal mode.

In step S302, the computer 110 uses a predetermined application to read image information such as documents and images.

In step S303, the computer 110 determines, from the information added to the image information read in step S302, whether the read image information is to be output in the specific mode, that is, whether the read image information is to be charged. If the image information is to be output in the specific mode, the computer 110 instructs the image processing apparatus 130 to switch to the specific mode.

In step S304, the image processing apparatus 130 uses the specific mode recognizing unit 131 to determine whether information instructing switching from the normal mode to the specific mode has been received. If the image processing apparatus 130 has determined that the information has been received, it proceeds to processing from step S303. If the information has not been received, the image processing apparatus 130 continuously operates in the normal mode.

In step S305, when the image processing apparatus 130 receives information instructing switching from the normal mode to the specific mode, it starts to operate in the specific mode.

In step S306, the image processing apparatus 130 determines whether the printer 120 can perform print-output. If the printer 120 can perform print-output, the image processing apparatus 130 notifies the computer 110 of the determination, and proceeds to processing from step S309. If the printer 120 cannot perform print-output, the image processing apparatus 130 is set to be in standby condition until the printer 120 can perform print-output.

In step S307, when the printer 120 is set so as to perform print-output, the image processing apparatus 130 notifies the computer 110 of the operational condition. Accordingly, the computer 110 recognizes that the printer 120 can perform print-output.

In step S308, the computer 110 transmits the job based on the image information read in step S302 to the image processing apparatus 130.

In step S309, the image processing apparatus 130 receives the job from the computer 110. In step S310, the image processing apparatus 130 expands image information into bitmap data in accordance with the print-output information included in the received job and transmits the bitmap data to the printer 120, together with information % instructing the execution of print-output.

In the image processing apparatus 130, a storage unit used for expanding the image information into the bitmap data is set so that no data remain when data transmission to the printer 120 ends.

In step S311, the printer 120 executes the print-output of the transmitted image information in accordance with the print-output instruction transmitted from the image processing apparatus 130.

In step S312, the printer 120 notifies the image processing apparatus 130 of the result of the print-output in step S310.

When receiving the output result notification from the printer 120 in step S313, the image processing apparatus 130 transmits it to the computer 110 in step S314.

In step S315, the computer 110 receives and recognizes the notification from the image processing apparatus 130.

As described above, in this embodiment, when the specific mode is set, the image information output from the computer 110 is printed by the printer 120 without being stored, and the number of times the image information is printed can be managed in one downloading operation by the computer 110. This prevents a user from falsely obtaining a large number of reproductions by changing the number of output pages when the specific mode is set and from % illegally copying spooled image information. In addition, even in the case where the image information output from the computer 110 has a copyright and is specific image information to be charged (hereinafter referred to as "image information with a charge"), the number of printed pages is managed and the output of an arbitrary number of pages is not allowed. Therefore, the copyright of the image information can be securely protected.

Second Embodiment

Figure 4:
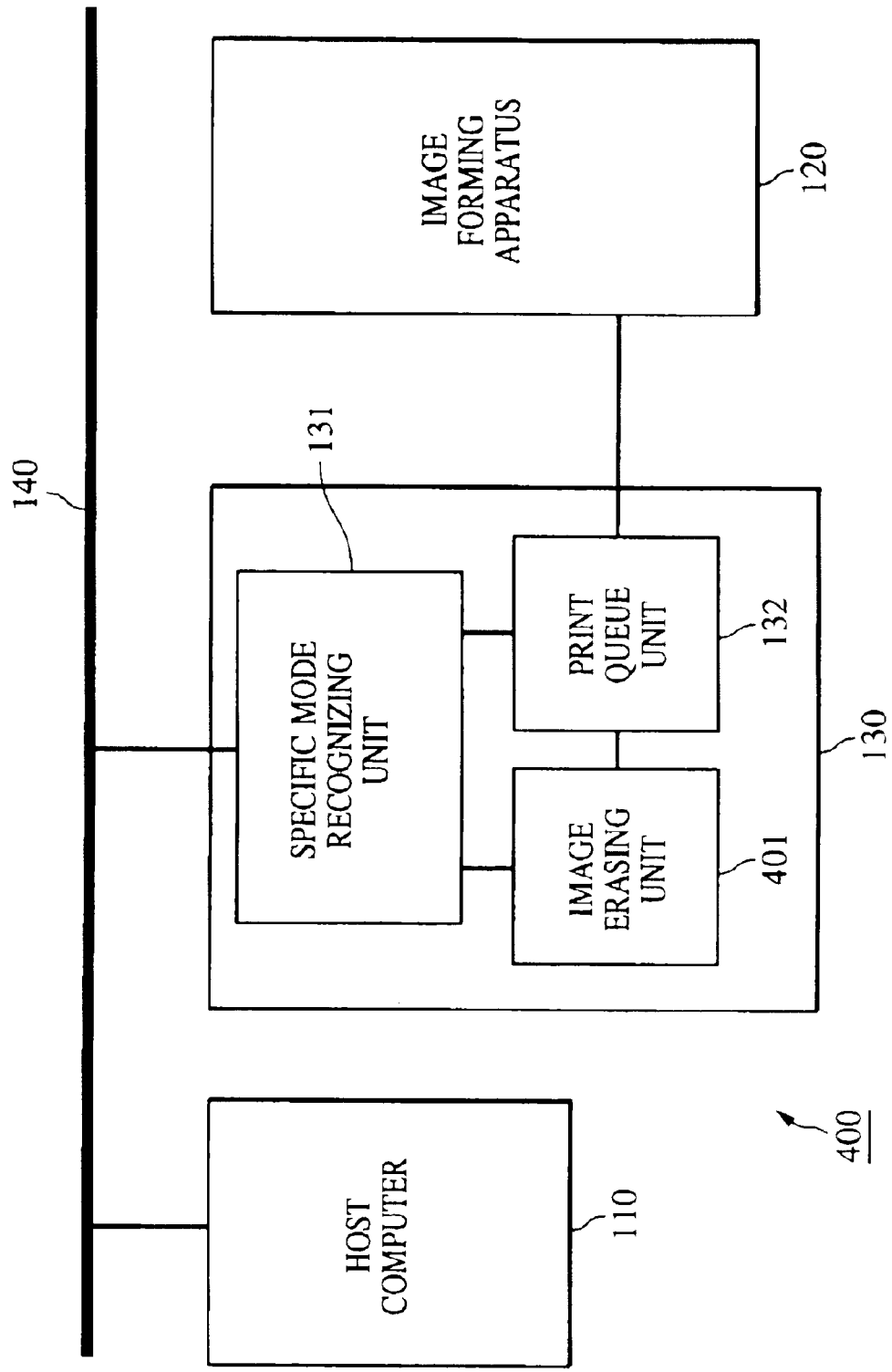
FIG. 4 is a block diagram showing a print system according to a second embodiment of the present invention.

The present invention is applied to, for example, the print system 400 shown in FIG. 4.

The print system 400 is similar in structure to the print system 100 shown in FIG. 1, but differs in that an image processing apparatus 130 further includes an image erasing unit 401.

When the print system 400 is set to be in the specific mode (or when image information to be output by printing is image information to be charged), the print system 400 erases image information output by the computer 110 after outputting the image information by printing.

Figure 5:
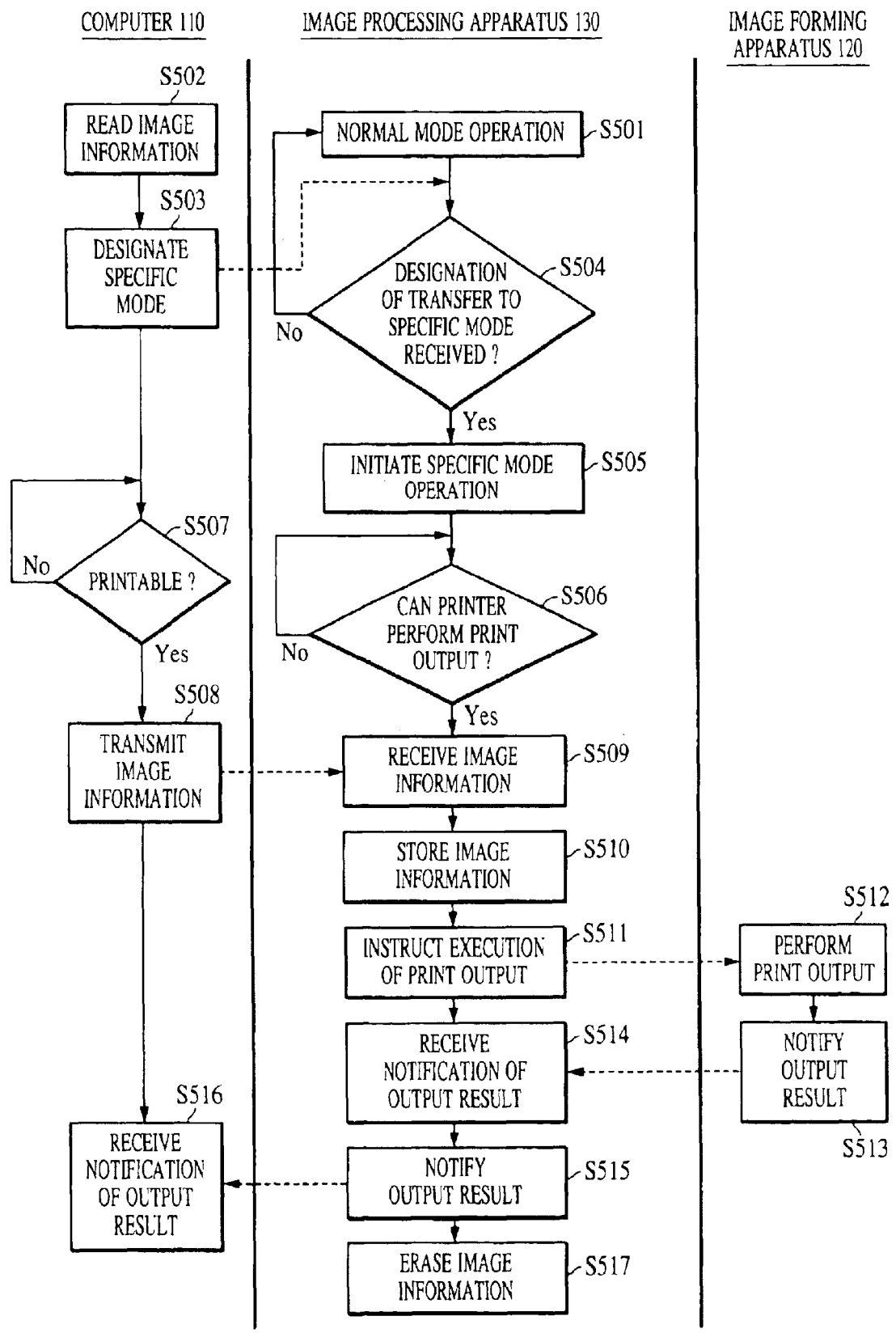
FIG. 5 is a flowchart illustrating the print system shown in FIG. 2 when it is set to be in a specific mode.

Accordingly, a process performed by the print system 400 when it is set to be in the specific mode is indicated by the flowchart shown in FIG. 5. The process is specifically described below.

In the print system 400, components functioning similarly to those in the print system 100 are denoted by the same reference numerals, and descriptions thereof are omitted. In the second embodiment, only differences from the print system 100 are specifically described.

Figure 3:
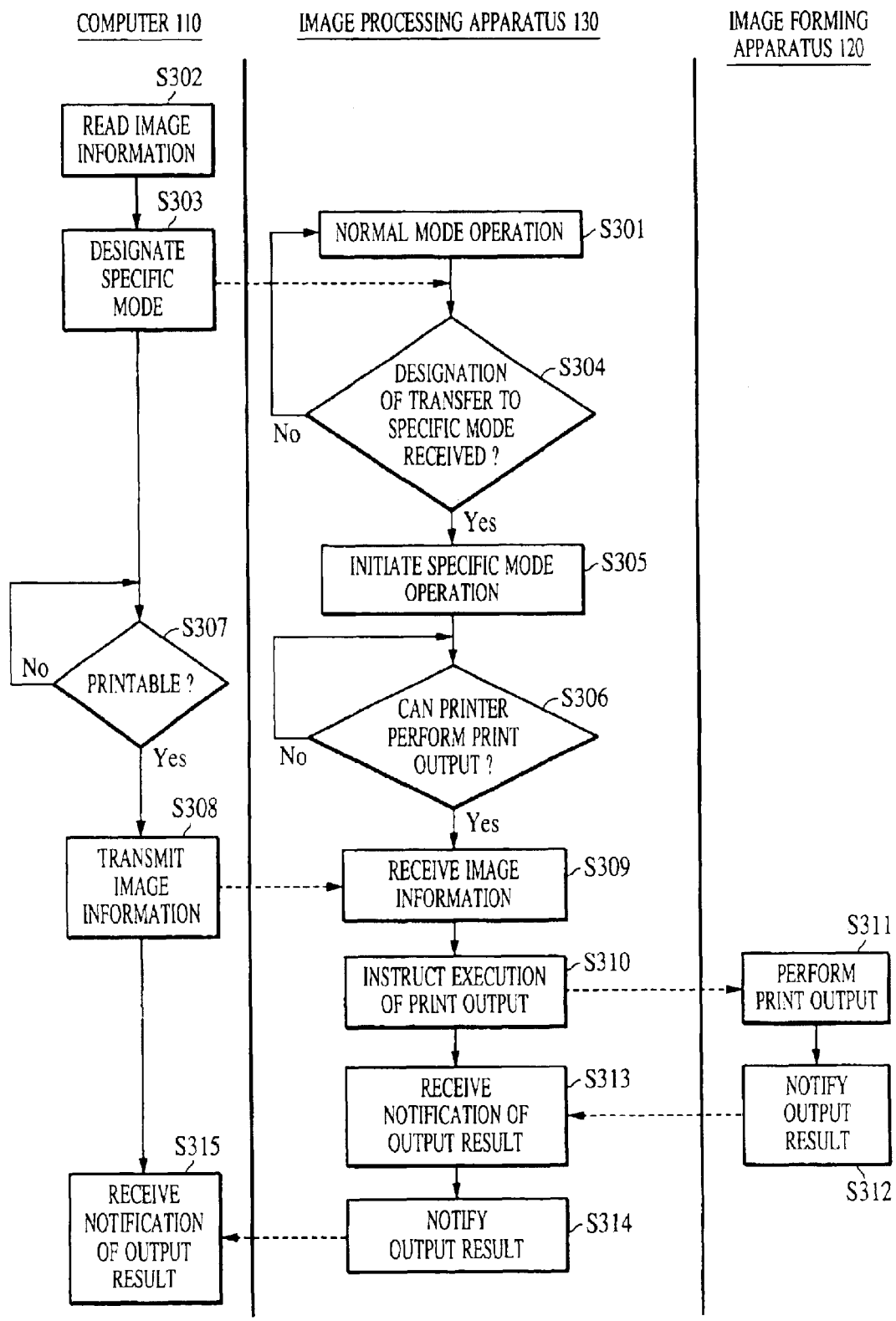
FIG. 3 is a flowchart illustrating the operation of the print system shown in FIG. 1 when it is set to be in a specific mode.

In steps S501 to S509, similarly to steps S301 to S309 shown in FIG. 3, when an image processing apparatus 130 uses a specific mode recognizing unit to recognize reception of an instruction for performing switching to the specific mode, and recognizes that a printer 120 can perform print-output, the image processing apparatus 130 receives a job (image information) from a host computer 110.

In step S510, the image processing apparatus 130 records (stores) the job from the computer 110 in a print queue (spooler) unit 132 corresponding to the job.

In step S511, the image processing apparatus 130 transmits the job recorded in the print queue unit 132 in step S510 to the printer 120, together with information representing an instruction for executing print-output.

In step S512, the printer 120 executes the printing of the transmitted image information in accordance with the print-output instruction transmitted from the image processing apparatus 130.

In step S513, the printer 120 notifies the image processing apparatus 130 of the result of the printing executed in step S512.

When receiving the output result notification from the printer 120 in step S514, the image processing apparatus 130 transmits it to the computer 110 in step S515.

In step S516, the computer 110 receives and recognizes the notification from the image processing apparatus 130.

In step S517, the image processing apparatus 130 uses the image erasing unit 401 to erase the job recorded in the print queue unit 132, that is, a job corresponding to the output result notification received from the printer 120 in step S512.

As described above, also in the case where when the specific mode is set, the image information output from the computer 110 is erased just after being printed by the printer 120, it is possible to securely prevent the user from falsely changing the number of output pages and to securely protect the image information output from the computer 110 if the user is charged for the image information, as in the first embodiment.

In also the second embodiment, similarly to the first embodiment, the specific mode recognizing unit 131 of the image processing apparatus 130 may be used as a charge image information recognizing unit.

In the first and second embodiments, when switching to the specific mode is performed (or when the charge image information is recognized), the image processing apparatus 130 may encode the image information output from the computer 110 in accordance with a predetermined format, and may transmit the encoded image information to the printer 120. Therefore, unless the printer 120 includes a decoder for decoding the encoded image information, the printer 120 cannot perform printing. This securely prevents the user from illegally obtaining image information having a copyright by using an arbitrary printer.

In the first and second embodiments, when switching to the specific mode is performed (or when the charge image information is recognized), after completing print-output from the printer 120, the image processing apparatus 130 may erase image information printed by the printer 120 which is stored in the computer 110, and image information in the image-information supplier which corresponds to the image information in the computer 110. For example, the image processing apparatus 130 may send, to the computer 110 or the server, a signal for instructing erasure of the image information.

In addition, when the computer 110 transmits, to the image processing apparatus 130, image information to be printed in the normal mode, it may transmit the image information in the form of a page description language (PDL). When the computer 110 transmits the image information in the specific mode, it may transmits the image information in the form of bitmap data so that the need for expanding PDL data into bitmap data by the image processing apparatus 130 is eliminated. Accordingly, the image processing apparatus 130 is not required to store data in order to perform the data expansion.

The foregoing objects of the present invention are definitely achieved by also using the steps of providing a system or apparatus with a storage medium containing the program code of software realizing the functions of the computer 110 and the terminal in each embodiment, and reading and executing, by the computer (central processing unit (CPU) or microprocessor unit) of the system or apparatus, the program code stored on the storage medium. In this case, the program code read from the storage medium, itself, realizes the functions in each embodiment, and the storage medium containing the program code is included in the present invention.

The type of the storage medium for providing the program code may include a read only memory, a floppy disk, a hard disk, an optical disk, a magnetooptical disk, a compact disk read only memory, a compact disk-rewritable, a magnetic tape, and a nonvolatile memory card.

The execution of the program code read by the computer includes not only the realization of the functions in each embodiment but also the case where the functions in each embodiment are realized such that an operating system or the like performs, based on instructions from the program code, all or part of actual processing.

In addition, the realization of the functions in each embodiment definitely includes the case where after the program code read from the storage medium is written in a memory provided on an add-in board or in an add-in unit connected to the computer, the functions in each embodiment are realized such that the CPU (or the like) of the add-in board or add-in unit executes all or part of actual processing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   receiving means for receiving image information, wherein the image information includes a code to indicate whether the image information is permitted to be output;
   control means for controlling storage and output of the image information;
   storage means for storing, according to control by said control means, the image information received by said receiving means;
   output means for outputting the image information received by said receiving means in accordance with the code in the image information; and
   discriminating means for discriminating among modes used in outputting the image information via said output means;
   wherein said control means controls said storage means so that the image information output by said output means is not retained in said storage means after the image information is output by said output means.

2. An image processing apparatus according to claim 1, wherein when said discriminating means discriminates a first mode among the modes, said control means stores the image information received by said receiving means in said storage means, sets said storage means so that the image information stored in said storage means can be overwritten, and controls said output means to output the stored image information, and
   wherein, when said discriminating means discriminates a second mode among the modes, said control means controls said output means to output the image information received by said receiving means without storing the image information received by said receiving means in said storage means.

3. An image processing apparatus according to claim 1, wherein when said discriminating means discriminates a first mode among the modes, said control means stores the image information received by said receiving means in said storage means, sets said storage means so that the image information stored in said storage means can be overwritten, and controls said output means to output the stored image information, and wherein, when said discriminating means discriminates a second mode among the modes, said control means stores the image information received by said receiving means in said storage means, controls said output means to output the stored image information, and erases the image information stored in said storage means after said output means outputs the stored image information.

4. An image processing apparatus according to claim 2, wherein said discriminating means discriminates among modes based on whether a fee is charged for the image information.

5. An image processing apparatus according to claim 2, wherein said discriminating means discriminates among modes based on an instruction from an image information transmitter.

6. An image processing apparatus according to claim 3, wherein said discriminating means discriminates among modes based on whether a fee is charged for the image information.

7. An image processing apparatus according to claim 3, wherein said discriminating means discriminates among modes based on an instruction from an image information transmitter.

8. A method for controlling an image processing apparatus, comprising the steps of:
    receiving image information, wherein the image information includes a code to indicate whether the image information is permitted to be output;
    storing the image information in storage, subject to a predetermined information storage control regime;
    outputting the image information received in said receiving step in accordance with the code in the image information; and
    discriminating among modes used in outputting the image information in said outputting step;
    wherein said controlling regime includes controlling so that the image information output in said outputting step is not retained in the storage after the image information is output in said outputting step.

9. A method according to claim 8,
    wherein when a first mode is discriminated among the modes in said discriminating step, the image information received in said receiving step is stored in the storage, the storage is set so that the image information stored in the storage can be overwritten, and the stored image information is output, and
    wherein when a second mode is discriminated among the modes in said discriminating step, the image information received by said receiving means is output without storing the image information in the storage.

10. A method according to claim 8,
    wherein when a first mode is discriminated among the modes in said discriminating step, the image information received in said receiving step is stored in the storage, the storage is set so that the image information stored in the storage can be overwritten, and the stored image information is output, and
    wherein when a second mode is discriminated among the modes in said discriminating step, the image information received in said receiving step is stored in the storage, the stored image information is output, and the image information stored in the storage is erased after being output.

11. A method according to claim 8, wherein in said discriminating step, modes are discriminated based on whether a fee is charged for the image information.

12. A method according to claim 8, wherein in said discriminating step, modes are discriminated based on an instruction from an image information transmitter.

* * * * *

UNITED STATES PATENT AND TRADEMARK OFFICE
CERTIFICATE OF CORRECTION

PATENT NO. : 6,930,787 B1  
DATED : August 16, 2005  
INVENTOR(S) : Minoru Hayasaki It is certified that error appears in the above-identified patent and that said Letters Patent is hereby corrected as shown below:

Column 5,
Line 20, "=but" should read -- but --.

Column 7,
Line 62, "%" should be deleted.

Column 8,
Line 18, "%" should be deleted.

Column 9,
Line 53, "transmits" should read -- transmit --.

Signed and Sealed this

Eleventh Day of April, 2006

JON W. DUDAS
*Director of the United States Patent and Trademark Office*